United States Patent
Sigg et al.

(10) Patent No.: US 10,720,810 B2
(45) Date of Patent: Jul. 21, 2020

(54) POSITIONING ACTUATOR AND MANUFACTURING METHOD

(71) Applicant: MMT SA, Zug (CH)

(72) Inventors: Daniel Sigg, Sonceboz-sombeval (CH); Philip Graf, Sonceboz-sombeval (CH)

(73) Assignee: MMT SA, Zug (CH)

( * ) Notice: Subject to any disclaimer, the term of this patent is extended or adjusted under 35 U.S.C. 154(b) by 334 days.

(21) Appl. No.: 15/548,556

(22) PCT Filed: Feb. 4, 2016

(86) PCT No.: PCT/EP2016/052435
§ 371 (c)(1),
(2) Date: Aug. 3, 2017

(87) PCT Pub. No.: WO2016/124715
PCT Pub. Date: Aug. 11, 2016

(65) Prior Publication Data
US 2017/0373555 A1    Dec. 28, 2017

(30) Foreign Application Priority Data

Feb. 4, 2015    (FR) ...................................... 15 50881

(51) Int. Cl.
*H02K 5/08* (2006.01)
*H02K 5/173* (2006.01)
(Continued)

(52) U.S. Cl.
CPC ............. *H02K 5/08* (2013.01); *H02K 5/1732* (2013.01); *H02K 5/20* (2013.01); *H02K 5/225* (2013.01);
(Continued)

(58) Field of Classification Search
CPC .......... H02K 5/08; H02K 5/1732; H02K 5/20; H02K 5/225; H02K 7/116; H02K 9/19;
(Continued)

(56) References Cited

U.S. PATENT DOCUMENTS 7,036,206 B2    5/2006  Worden et al.
2005/0199201 A1*  9/2005  Schafer .................. F01L 1/022
                                                    123/90.17
(Continued)

FOREIGN PATENT DOCUMENTS

DE              4444136 A1    6/1996

*Primary Examiner* — Alfonso Perez Borroto
*Assistant Examiner* — Rashad H Johnson
(74) *Attorney, Agent, or Firm* — Harness, Dickey & Pierce, PLC

(57) ABSTRACT

A positioning actuator includes a stator assembly and a rotor, a printed circuit provided with electronic components, as well as a reduction gear for driving a rotary member. It includes two complementary blocks, the first block being made up of a shell having thermal conductivity no lower than 1 W/m/K, the first block including the reduction gear and having a passage for the output shaft of the reducing gear as well as an open opposing surface; the second block being formed by overmoulding the stator assembly and having a rear bearing recess for the rotor, the second block having a joining surface which complements a joining surface of the first block. The actuator also includes the electronic circuit which is positioned in a space defined between the first and second blocks. The disclosure also relates to a method for manufacturing such an actuator.

16 Claims, 5 Drawing Sheets

(51) Int. Cl.
  *H02K 5/20*   (2006.01)
  *H02K 5/22*   (2006.01)
  *H02K 7/116*  (2006.01)
  *H02K 9/19*   (2006.01)
  *H02K 15/12*  (2006.01)
  *H02K 11/33*  (2016.01)
  *H02K 11/215* (2016.01)

(52) U.S. Cl.
  CPC ............... *H02K 7/116* (2013.01); *H02K 9/19* (2013.01); *H02K 11/215* (2016.01); *H02K 11/33* (2016.01); *H02K 15/12* (2013.01); *H02K 2203/03* (2013.01); *H02K 2211/03* (2013.01)

(58) Field of Classification Search
  CPC ...... H02K 11/215; H02K 11/33; H02K 15/12; H02K 2211/03
  USPC .................................................. 310/54, 60 R
  See application file for complete search history.

(56) References Cited

U.S. PATENT DOCUMENTS

| | | | |
|---|---|---|---|
| 2010/0060092 A1* | 3/2010 | Blakesley | H02K 5/1677 310/83 |
| 2014/0021808 A1* | 1/2014 | Palfenier | H02K 5/20 310/43 |
| 2014/0021832 A1* | 1/2014 | Palfenier | H02K 7/116 310/68 B |
| 2014/0339966 A1* | 11/2014 | Tomizawa | H02K 5/22 310/68 D |
| 2015/0075311 A1* | 3/2015 | Kanzaki | F16H 57/02 74/421 A |
| 2015/0326089 A1 | 11/2015 | Neunzig et al. | |
| 2015/0333603 A1 | 11/2015 | von Willich et al. | |

* cited by examiner

POSITIONING ACTUATOR AND MANUFACTURING METHOD

CROSS-REFERENCE TO RELATED APPLICATIONS

This application is a National Phase Entry of International Patent Application No. PCT/EP2016/052435, filed on Feb. 4, 2016, which claims priority to French Patent Application Serial No. 1550881, filed on Feb. 4, 2015, both of which are incorporated by reference herein.

TECHNICAL FIELD

The present invention relates to the field of electromagnetic actuators, in particular actuators for motorized valves. As an example, the general structure of such a motorized valve is described in the patent WO2010027447. In order to improve the robustness of such actuators, it is known practice to encapsulate a part of the components of the motor in a plastic material. This overmolding ensures that components subjected to vibrations are secured and promotes the heat transfer. It also makes it possible to eliminate the screwing or gluing assembly operations.

BACKGROUND

U.S. Pat. No. 7,036,206 is known in the prior art, describing a method for overmolding a stator structure, comprising a step of construction of an intermediate stator assembly, including the assembly of the bobbin assembly on a stator core having an internal and external diameter, a step consisting in disposing the intermediate stator assembly in a mold device comprising a cover half and an ejector half that includes an inner core of the ejector and a movable plate, and a step of loading a bearing in the molding device, and closing the cover half causing the movable plate to travel within the mold. A unitizing material is then injected into the molding device to encapsulate the intermediate stator assembly and form an overmolded motor stator structure.

Also known is the patent application WO2010/027447 describing a brushless direct current actuator, comprising a housing which includes a base delimiting a cavity intended to receive a motor assembly and a cap delimiting a cavity intended to receive a gear assembly. A printed circuit board assembly is placed in the housing between the motor assembly and the gear assembly. A rotor shaft passes through an opening formed in the printed circuit board assembly to be coupled to the gear assembly. An output shaft is coupled to the gear assembly and passes through the cap. According to one embodiment, a bearing and a bearing retaining element are mounted on a sleeve formed in the base so as to hold the rotor in the housing. According to another embodiment, a rotor retaining pin provided with a proximal head abutting against the top of the rotor and a threaded or notched distal end passes through the sleeve of the housing so as to hold the rotor in the housing. The patent application WO2014/090953 describes another direct current motor solution without overmolding of the stator.

The prior art solutions relate to the production of an overmolded stator structure, which is then assembled in the usual manner with the other components of the motor. They do not avoid the problems of vibration with a large number of subassemblies to be secured and heat dispersion between the different components of the actuator, particularly when the electronic circuitry is positioned close to the stator assembly and opposite the cooling circuits. They also require a large number of components and, generally, several seals, making assembly complex. In particular, in the solution proposed by the patent application WO2010/027447, the part formed by a jacket containing a stator assembly, bearing bobbins, is not overmolded but fixed by mechanical means that are not specified in the application, requiring complex assembly and an additional production step.

SUMMARY

In order to remedy these drawbacks, the present invention relates, according to its most general sense, to a positioning actuator comprising a stator assembly and a rotor, a printed circuit provided with electronic components, as well as a reduction gear for driving a rotary member characterized in that it comprises two complementary blocks, the first block consisting of a jacket having a thermal conductivity greater than or equal to 1 W/m/K, said first block incorporating said reduction gear and having a passage for the output shaft of the reduction gear and an open opposing surface, said second block consisting of overmolding of the stator assembly and having a recess for rear bearing for the rotor, said second block having a joining face which complements a joining face of said first block, the actuator being also characterized in that said electronic circuit is positioned in a space defined between said first and second blocks. Thus, the assembly of the actuator is simplified compared to the prior art and the electronic circuit can benefit from a favorable thermal conductivity of the first block to ensure an acceptable working temperature.

The overmolding of the stator forms the second block, which is thus closed by the front surface of the overmolding of the stator. This solution differs fundamentally from the teaching of the patent WO2010/027447, which proposes housing the bobbins in a part in which they are fixed by unspecified mechanical means. This embodiment does not in any way make it possible to ensure the thermal functions ensured by a block entirely formed by the overmolding. It goes against the mounting simplicity sought and does not make it possible to ensure a good insensitivity to vibrations.

The actuator thus consists of three independent components:
a first block with high thermal conductivity incorporating all of the mechanical components
a monolithic second block, with no moving parts, consisting of a block of plastic material overmolding the stator and the electrical connector, and having the bearing to guide the shaft of the rotor
a printed circuit comprising the electronic components and being housed in the space provided at the interface of these two blocks. This printed circuit is linked mechanically and electrically with the stator elements and the electrical connector of the monolithic second block.

The assembly is extremely simple since the three parts do not include any detachable parts that have to be held during assembly (except, possibly, for the rotor), and are then assembled mechanically and electrically by simply bringing these three parts together. Advantageously, said joining face of said second block has a peripheral groove for receiving a seal capable of coming to bear on the complementary face of said first block. Alternatively, it is the first block which has a peripheral groove for receiving a seal capable of coming to bear on the complementary joining face of said second block. It is also possible to imagine a seal being positioned to bear facing the joining faces of the first and second blocks. Thus, the actuator only requires an assembly step in which the two assemblies that are to be assembled are considered and between which is positioned a single seal.

Preferably, the bearings that are present, and in particular the bearing of the rotor, have at least one groove receiving an annular seal capable of being compressed upon the insertion into said recess of the second block. In this way, the insertion of the bearings incorporating at least one annular seal ensures, on the one hand, a seal-tightness, but also a mechanical securing on the other hand. It is thus not necessary to add a preload to the bearing to avoid deterioration of the actuator when the latter is subjected to vibrations in the application.

According to a variant, said first block has a recess for receiving a front bearing of the rotor. Advantageously, the front bearing of the rotor has at least one groove receiving an annular seal capable of being compressed upon the insertion into said recess of the first block. According to a particular variant, the first block is produced in a material of high thermal conductivity and includes a circuit for the circulation of a coolant.

According to a particular embodiment, the electrical link between the stator elements and the printed circuit is produced by connection pins overmolded in said second block. According to a variant, the second block also comprises an overmolded connector. Advantageously, said second block has a connection assembly formed by a plurality of pins having an area of connection with an electrical wire prolonged by a connection pin with the printed circuit.

According to a particular embodiment, said connection assembly is has a plurality of female connectors, for the insertion and holding of connection pins between a wire and a track of the printed circuit. Advantageously, said overmolded connection assembly has a flange for coupling with a protective sheath of a bundle of cables. Preferably, the thickness of the overmolding of the internal part of the stator is greater than the thickness of the overmolding of the external part of the stator.

"Internal part" should be understood to mean the part of the stator and in particular of the bobbins situated in the interface space between the first and second blocks. This feature makes it possible to promote the heat exchanges outward from the actuator. The invention relates also to a method for manufacturing an overmolded stator assembly for a positioning actuator as claimed in at least one of the preceding claims, characterized in that a stator assembly is positioned in a mold using a gripping device having pins capable of penetrating into complementary orifices, oriented axially, provided on the stator structure, the mold having a central hub of a section complementing the internal section of the stator structure, the mold also having at least one pin for the angular positioning of the stator structure upon its introduction into the mold using the gripping device.

BRIEF DESCRIPTION OF THE DRAWINGS

The present invention will be better understood on reading the following description, relating to a nonlimiting exemplary embodiment referring to the attached drawings in which.

DETAILED DESCRIPTION

Figure 1:
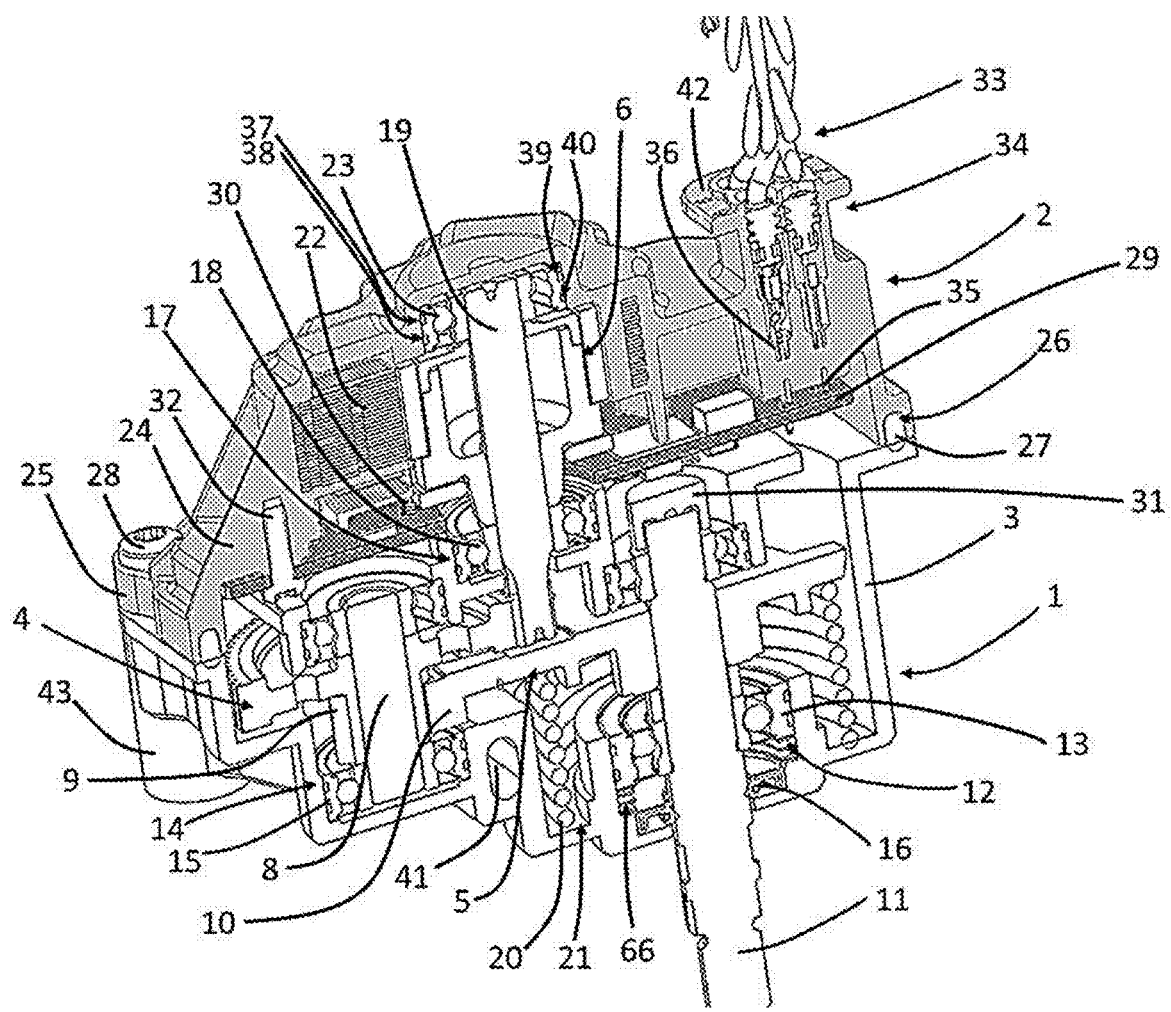
FIG. 1 represents a cross-sectional view of an actuator according to the invention.

FIG. 1 represents an example of an actuator consisting of two coupled complementary blocks (1, 2). The first block (1) consists, in the present example, of a metal shell (3) produced by aluminum casting for example. This first block (1) can also be produced in a material exhibiting a good thermal conductivity (typically greater than 1 W/m/K) such as, for example, a plastic filled with silica or aluminum particles. The first block (1) comprises a reduction gear formed by a first stage (4) and a second stage (5). The first stage (4) a driving gear secured to the rotor (6) and a driven gear (7) supported by a shaft (8) and driving an intermediate gear (9). This intermediate gear (9) forms part of the second stage (5), and drives the gear (10) secured to the output shaft (11).

The shell (3) has the bores for receiving the bearings notably a recess (12) for a front bearing (13) and a second recess (14) for a bearing (15) guiding the shaft (8). These bearings advantageously have at least one groove to receive a seal, generally annular. This seal then ensures seal-tightness and mechanical holding when the bearing is installed, compressed, in its recess. This device thus makes it possible to ensure that the actuator is held under vibration without necessarily needing a preload spring. FIG. 1 shows a spring washer (66) in the front recess (12) under the bearing (13), in the case where the vibrations applied are particularly significant.

A lip seal (16) ensures the seal-tightness between the shaft (11) and the shell (3). The shell (3) also has a rear recess (17) in which is fitted a bearing (18) intended to guide the motor shaft (19). A spring (20) ensures that a pressure is exerted on the front leading face (21) of the shell (3) and the gear (10). This spring ensures the return to "fail-safe" safety position in case of malfunctioning of the actuator.

The second block (2) comprises a stator assembly (22) and a rear bearing (23) overmolded in a mass of thermosetting plastic (24) whose outer configuration forms fixing lugs (25). The rear bearing (23) has two annular grooves (37, 38) in which are housed elastic seals (39, 40) to ensure mechanical attachment in the cavity provided at the rear of the second block (2). The rear bearing (23) can thus be inserted into the second block (2) by forcing insertion in an axial direction.

This block (2) has a peripheral groove (26) for housing a seal (27) ensuring the seal-tight closure of the two blocks (1, 2). This peripheral groove (26) could also be provided on the first block (1) only, or on both blocks (1, 2). The mechanical link between the two blocks (1, 2) is ensured by screws (28) passing through the lug (25) and being fixed in a tapping provided in the first block (1).

A printed circuit (29) is housed in the space defined between the block (1) and the block (2). This printed circuit (29) comprises the electronic components driving the motor and the sensors (30) detecting the magnetic position of the rotor (6). On the opposite face, the printed circuit (29) comprises a sensor (31) for detecting the angular position of the output shaft (11).

This printed circuit (29) is mechanically fixed onto the second block (2) by screws (32). The electrical link between the printed circuit (29) and the cable bundle (33) is ensured by an overmolded connector (34) incorporated in the second block (2). To this end, the printed circuit (29) has tinned drill-holes for cooperating with connectors of "pressfit" type (35) that themselves come to be fitted into female connectors (36) overmolded in the second block (2). Alternatively, these connectors of "pressfit" type (35) can prolong the connector (34) and be directly overmolded in the block (2).

The electronic circuit (29) is pierced to allow the passage of the shaft (19) of the rotor (11). The connector (34) has a flange (42) ensuring the protection of the cable bundle (33). In the example described, the first block (1) also comprises a cooling circuit based on circulation of a heat-transfer fluid. In a particular embodiment, the front block (1) has a recess to receive the end of a pre-fitted cable bundle (33), incorporating the connectors (36). To this end, the block (1) has a cavity (41) whose ends emerge on the surface of the block (1), to allow for the coupling of fluid inlet and outlet ducts. The fixing of the assembly is ensured by columns (43) formed in the first block (1) allowing a link by screws, rivets or any other standard means.

Figure 2:
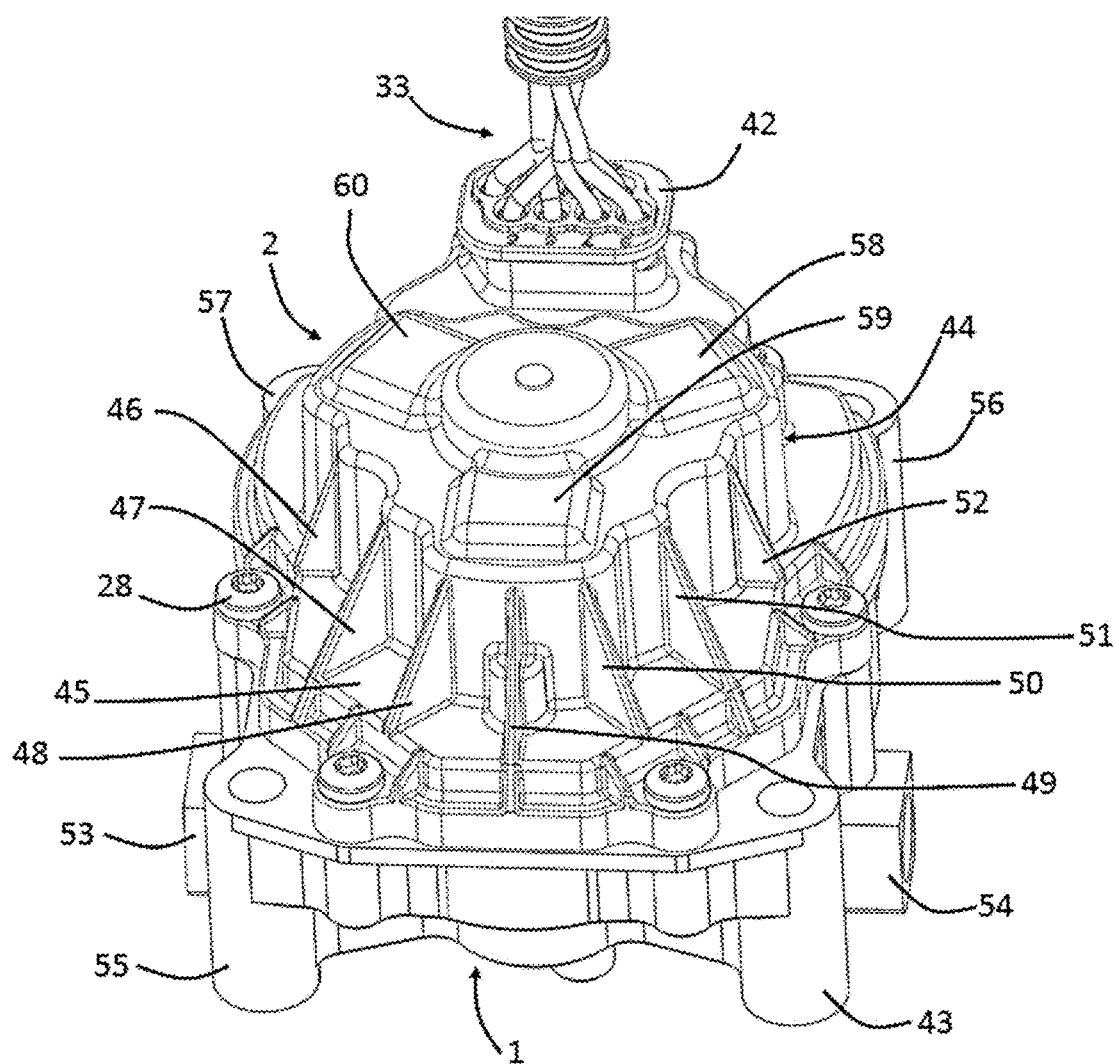
FIG. 2 represents a perspective view of the actuator of FIG. 1.

FIG. 2 represents a perspective external view of the actuator. The second block (2) made of plastic material has a part (44) which closely matches the form of the stator, then flaring to, in a second part (45), open on the link surface with the first block (1). Stiffeners (46 to 52) extend between these two parts (44, 45) to ensure a good mechanical strength and limit the thickness of the overmold. The protuberances (58 to 60) correspond to the leak-out wires of the stator bobbins. The first block (1) has, on one side, an input orifice (53) emerging in the cooling cavity (41) and, on the opposite side, an output orifice (54), to allow the coupling to a cooling system based on circulation of a heat-transfer fluid. The fixing is ensured using columns (43, 55, 56, 57).

Figure 3:
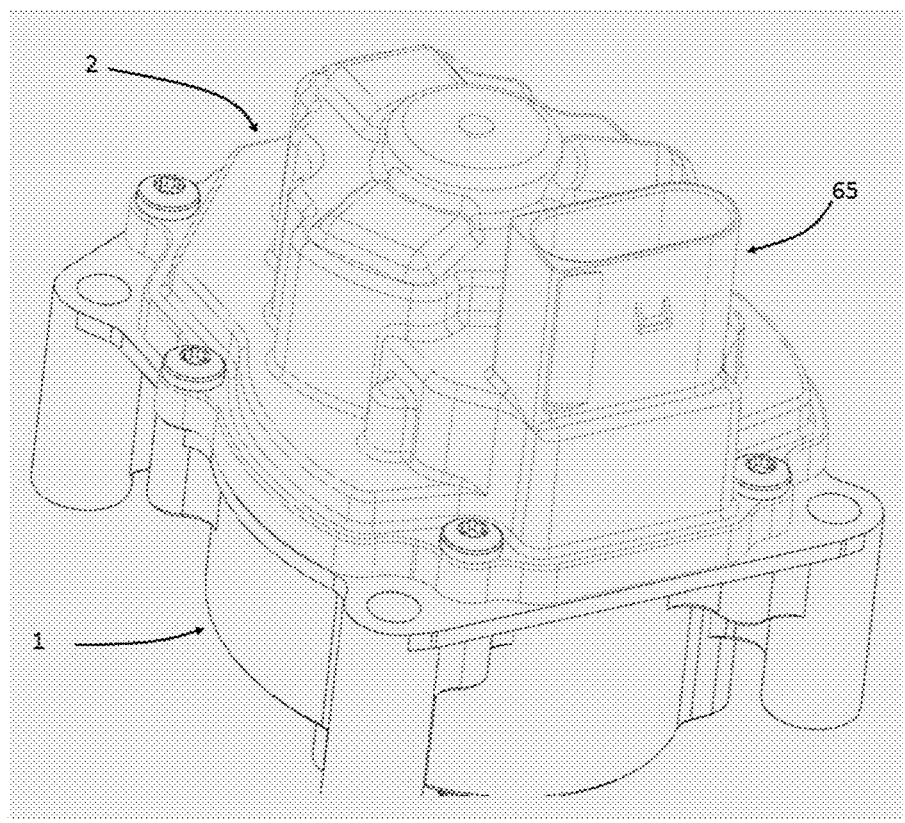
FIG. 3 represents a perspective view of a first variant of said actuator.
Figure 4:
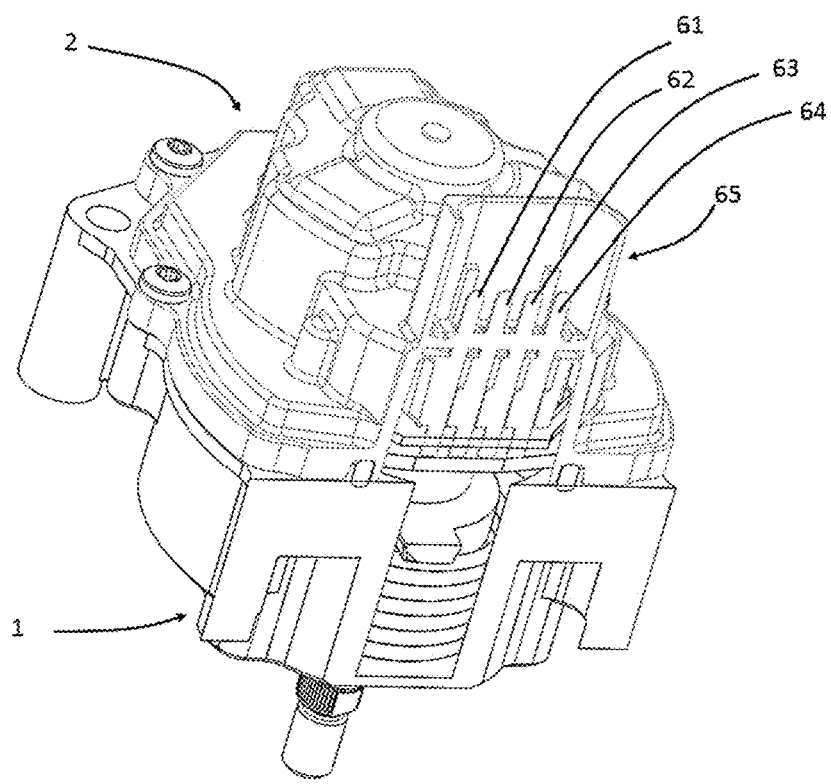
FIG. 4 represents a partial cross-sectional view of the embodiment presented in FIG. 3.

FIGS. 3 and 4 represent a variant of the invention, respectively in a perspective view and according to a partial cross section along a plane passing through a male connector formed by the overmolded shaping of the block (2). The connection is ensured according to this exemplary embodiment by metal pins (61 to 64) overmolded in the second block (2). The rear ends of the pins (61 to 64) are free to allow a complementary female connector to be fitted. The section of the rear part of this area of connection complements the section of the connectors prolonging a cable bundle. The front ends are configured to allow an insertion on the printed circuit, for example through the intermediary of "pressfit" female connectors or by soldering.

Figure 5:
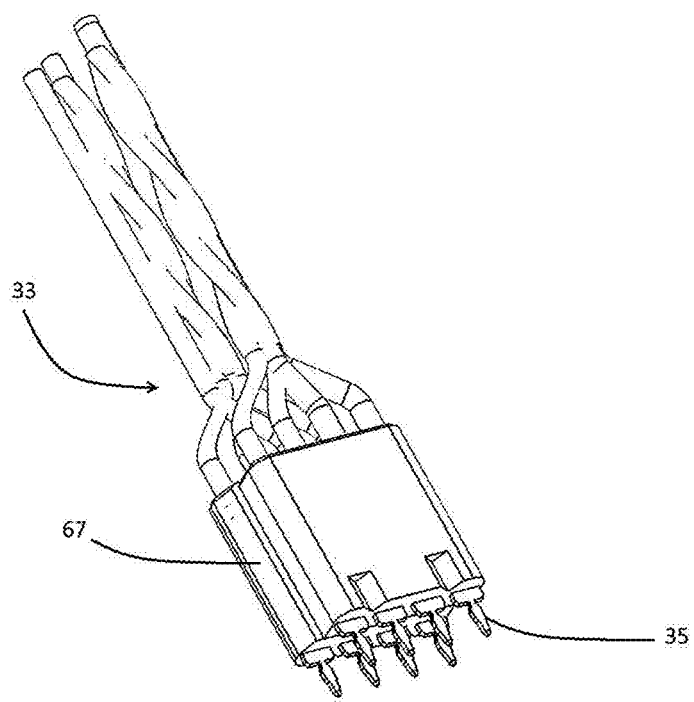
FIG. 5 represents a view of an overmolded bundle that can be used in a second variant of the actuator.
Figure 6:
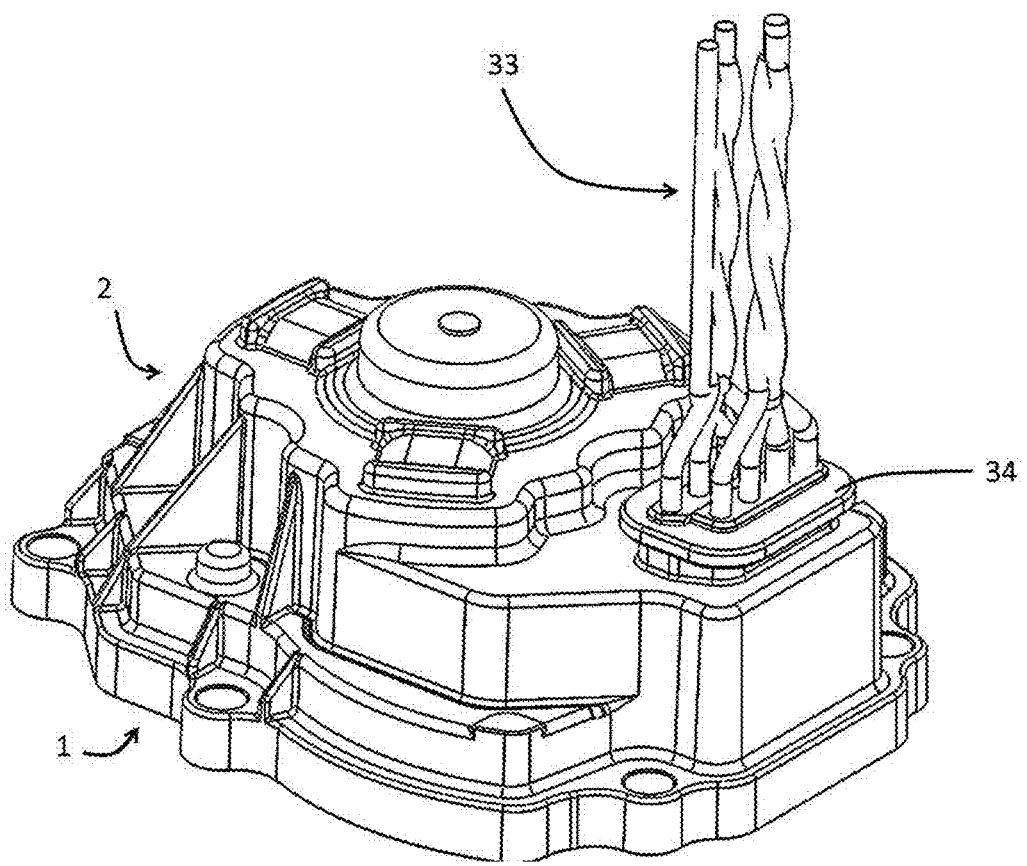
FIG. 6 represents a perspective view of the second variant of the actuator.

In a variant embodiment, it is possible to envisage producing the cable bundle (33) separate from the motor, and directly linked, by an overmolding (67), to the connectors of "pressfit" type (35). This overmolded bundle is presented in FIG. 5. It is intended for a second embodiment of the actuator, as presented in FIG. 6, in which the molded connector (34) is intended to directly receive, by simple mechanical insertion and possibly gluing or soldering, this overmolded bundle (33).

Figures 7A, 7B, 7C:
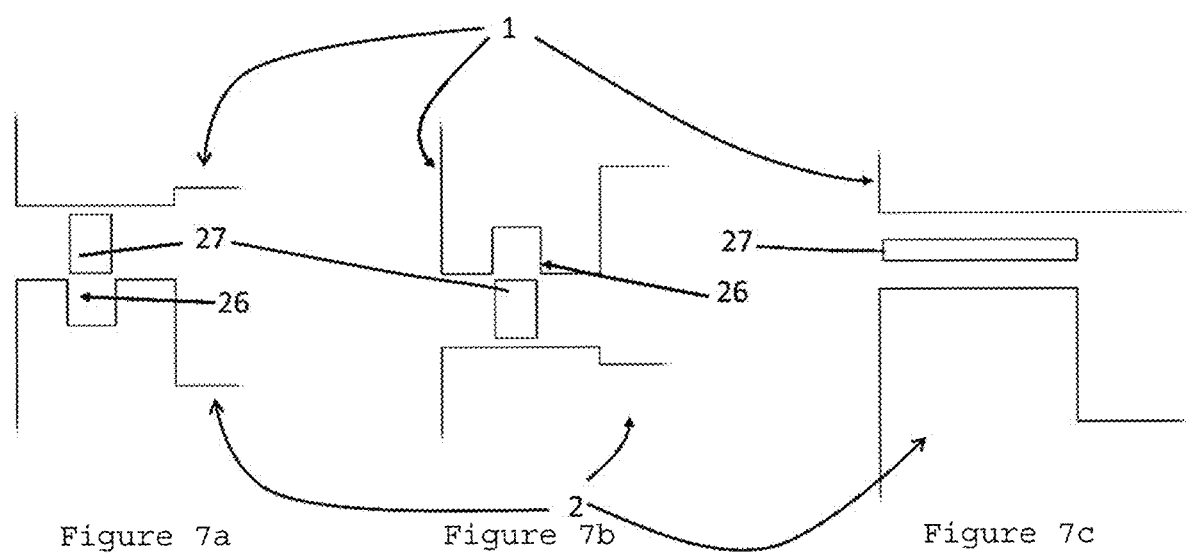
FIGS. 7a to 7c represent schematic views of different possible seal-tight joints of the two blocks according to the invention.

The seal-tightness between the two blocks (1) and (2) can be produced in several ways as can be seen schematically represented in cross-sectional views in FIGS. 7a to 7c. In FIG. 7a, the block (2) has a groove (26) intended to receive a seal (27) capable of coming to bear on the complementary joining face of the block (1). In FIG. 7b, it is the block (1) which has a groove (26) intended to receive a seal (27) capable of coming to bear on the complementary joining face of the block (2). In FIG. 7c, a wide "cylinder head gasket" type seal is simply positioned between the two blocks (1) and (2).

The invention relates also to a method for manufacturing such an actuator, consisting in separately preparing three components:

a first block (1) incorporating said reduction gear (4, 5) and having a passage for the output shaft (11) of the reduction gear (4, 5) and an open opposing surface, a second block (2) consisting of overmolding of the stator assembly (22) and having a recess for rear bearing (23) for the rotor, said second block (2) having a joining face which complements a joining face of said first block (1), an electronic circuit (29), having tinned drill-holes complementing overmolded connectors in the second block.

The second block is produced by the overmolding of the stator assembly to form a monolithic part having an axial passage emerging on one side only, the bottom of this part forming a recess for the placement of a bearing. The assembly is done by pressing the printed circuit onto the second block in order to ensure the electrical and mechanical link. A seal is then deposited in the peripheral groove (26) and the first block is then brought together with these two components already assembled, in order to finalize the assembly. The screws (28) ensure the link between the blocks and, if necessary, the mounting on a complementary piece of equipment.

The invention claimed is:

1. A positioning actuator comprising:
   a stator assembly;
   a rotor;
   a printed circuit provided with electronic components;
   a reduction gear for driving a rotary member;
   two complementary blocks, a first of which includes a jacket having a thermal conductivity greater than or equal to 1 W/m/K;
   the first block incorporating the reduction gear and having a passage for an output shaft of the reduction gear and an open opposing surface;
   a second of the block including an overmolding of the stator assembly and having a recess for a rear bearing for the rotor, the second block having a joining face which complements a joining face of the first block; and
   the circuit being positioned in a space defined between the first and the second blocks.

2. The positioning actuator as claimed in claim 1, wherein the joining face of the second block has a peripheral groove for receiving a seal capable of coming to bear on the complementary joining face of the first block.

3. The positioning actuator as claimed in claim 1, wherein the joining face of the first block has a peripheral groove for receiving a seal capable of coming to bear on the complementary joining face of the second block.

4. The positioning actuator as claimed in claim 1, further comprising a seal positioned to bear facing the joining faces of the first and second blocks.

5. The positioning actuator as claimed in claim 1, further comprising several bearings and at least a rear of the bearings of the rotor having at least one groove receiving an annular seal capable of being compressed upon insertion into the recess of the second block.

6. The positioning actuator as claimed in claim 1, wherein the first block has a recess for receiving a front bearing of the rotor.

7. The positioning actuator as claimed in claim 6, wherein the front bearing of the rotor has at least one groove receiving an annular seal capable of being compressed upon the insertion into the recess of the first block.

8. The positioning actuator as claimed in claim 1, wherein the first block is a material of high thermal conductivity and includes a circuit for circulation of a coolant.

9. The positioning actuator as claimed in claim 1, wherein an electrical link between the stator assembly and the printed circuit includes connection pins overmolded in the second block.

10. The positioning actuator as claimed in claim 1, wherein the second block also comprises an overmolded connector.

11. The positioning actuator as claimed in claim 1, wherein the second block has a connection assembly formed by a plurality of pins having an area of connection with an electrical wire prolonged by a connection pin with the printed circuit.

12. The positioning actuator as claimed in claim 11, wherein the connection assembly has a plurality of female connectors, for the insertion and holding of connection pins between a wire and a track of the printed circuit.

13. The positioning actuator as claimed in claim 1, further comprising an overmolded connection assembly including a flange for coupling with a protection sheath of a bundle of cables.

14. The positioning actuator as claimed in claim 1, further comprising a thickness of an overmolding of an internal part of the stator assembly is greater than a thickness of an overmolding of an external part of the stator assembly.

15. A method for manufacturing an overmolded stator assembly for a positioning actuator, the method comprising:
    positioning the stator assembly in a mold using a gripping device having pins capable of penetrating into complementary orifices, oriented axially, provided on the stator assembly;
    the mold having a central hub of a section complementing the internal section of the stator assembly; and
    at least one pin of the mold angular positioning the stator assembly upon its introduction into the mold using the gripping device.

16. The method for manufacturing as claimed in claim 15, the method comprising separately preparing three components:
    (a) a first block incorporating a reduction gear and having a passage for an output shaft of a reduction gear and an open opposing surface;
    (b) a second block including overmolding of the stator assembly and having a recess for a rear bearing of a rotor, the second block having a joining face which complements a joining face of the first block;
    (c) an electronic circuit having tinned drill-holes which complement overmolded connectors in the second block;
    the second block being produced by the overmolding of the stator assembly to form a monolithic part having an axial passage emerging on one side only, the bottom of this part forming a recess for placement of a bearing;
    pressing the electronic circuit onto the second block in order to ensure an electrical and mechanical link; and
    depositing a seal in a peripheral groove and bringing the first block together with the second block and the electronic circuit already assembled, and screws ensuring the link between the blocks.

\* \* \* \* \*